United States Patent
Song et al.

(10) Patent No.: US 11,837,718 B2
(45) Date of Patent: Dec. 5, 2023

(54) NEGATIVE ELECTRODE FOR LITHIUM SECONDARY BATTERY AND LITHIUM SECONDARY BATTERY COMPRISING THE SAME

(71) Applicant: LG CHEM, LTD., Seoul (KR)

(72) Inventors: Jun Hyuk Song, Daejeon (KR); Oh Byong Chae, Daejeon (KR); Eun Kyung Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 286 days.

(21) Appl. No.: 16/642,751

(22) PCT Filed: Oct. 11, 2018

(86) PCT No.: PCT/KR2018/011987
§ 371 (c)(1),
(2) Date: Feb. 27, 2020

(87) PCT Pub. No.: WO2019/078544
PCT Pub. Date: Apr. 25, 2019

(65) Prior Publication Data
US 2021/0083273 A1    Mar. 18, 2021

(30) Foreign Application Priority Data
Oct. 16, 2017  (KR) .................... 10-2017-0134055

(51) Int. Cl.
*H01M 4/36* (2006.01)
*H01M 4/133* (2010.01)
(Continued)

(52) U.S. Cl.
CPC ........... *H01M 4/366* (2013.01); *H01M 4/133* (2013.01); *H01M 4/134* (2013.01); *H01M 4/364* (2013.01);
(Continued)

(58) Field of Classification Search
CPC ........... H01M 2004/027; H01M 4/134; H01M 4/364; H01M 4/405; H01M 4/382; H01M 4/386; H01M 4/583; H01M 4/587
See application file for complete search history.

(56) References Cited

U.S. PATENT DOCUMENTS

2003/0099885 A1 * 5/2003 Kim ................. H01M 4/742
429/247
2007/0092797 A1   4/2007 Konishiike et al.
(Continued)

FOREIGN PATENT DOCUMENTS

CN   102511094 A   6/2012
CN   102891274 A   1/2013
(Continued)

OTHER PUBLICATIONS

Junxiong Wu, Xianying Qin, Haoran Zhang, Yan-Bing He, Baohua Li, Lei Ke, Wei Lv, Hongda Du, Multilayered silicon embedded porous carbon/graphene hybrid film as a high performance anode, Carbon, vol. 84, pp. 434-443,ISSN 0008-6223, https://www.sciencedirect.com/science/article/pii/S000862231401197X (Year: 2013).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A negative electrode for a lithium secondary battery and a lithium secondary battery including the negative electrode
(Continued)

are disclosed. The negative electrode includes a negative electrode current collector, a first negative electrode active material layer present on the negative electrode current collector, and a second negative electrode active material layer present on the first negative electrode active material layer. The first negative electrode active material layer includes two or more kinds of first negative electrode active materials, and the second negative electrode active material layer includes a second negative electrode active material having swelling that is smaller than that of the first negative electrode active material layer. Therefore, the surface of the negative electrode does not exhibit deformation during pre-lithiation.

7 Claims, 1 Drawing Sheet

(51) Int. Cl.
    *H01M 4/134*     (2010.01)
    *H01M 4/38*     (2006.01)
    *H01M 4/48*     (2010.01)
    *H01M 4/587*     (2010.01)
    *H01M 10/0525*     (2010.01)
    *H01M 4/02*     (2006.01)

(52) U.S. Cl.
    CPC ............ *H01M 4/382* (2013.01); *H01M 4/386* (2013.01); *H01M 4/483* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2009/0061319 A1 | 3/2009 | Kim et al. | |
| 2009/0117463 A1* | 5/2009 | Takezawa | H01M 4/387 429/231.95 |
| 2012/0009472 A1* | 1/2012 | Yokoi | H01M 4/622 429/211 |
| 2012/0052388 A1 | 3/2012 | Jung et al. | |
| 2013/0040525 A1 | 2/2013 | Park et al. | |
| 2014/0255780 A1 | 9/2014 | Mikhaylik et al. | |
| 2014/0287315 A1 | 9/2014 | Troegel et al. | |
| 2014/0363736 A1 | 12/2014 | Kim et al. | |
| 2015/0235731 A1 | 8/2015 | Park et al. | |
| 2016/0006027 A1 | 1/2016 | Kim et al. | |
| 2016/0099462 A1 | 4/2016 | Jeong et al. | |
| 2016/0197342 A1* | 7/2016 | Lee | H01M 4/587 429/223 |
| 2016/0260973 A1* | 9/2016 | Sonobe | H01M 4/622 |
| 2018/0090750 A1 | 3/2018 | Oh et al. | |
| 2018/0219217 A1 | 8/2018 | Park et al. | |
| 2019/0044137 A1* | 2/2019 | Zhamu | H01M 4/134 |
| 2019/0115585 A1* | 4/2019 | Tsujiko | H01M 4/483 |
| 2020/0161701 A1* | 5/2020 | Koike | H01M 10/0566 |
| 2020/0303776 A1* | 9/2020 | Watanabe | H01M 4/36 |
| 2020/0335795 A1* | 10/2020 | Cha | H01M 4/0404 |
| 2020/0388832 A1* | 12/2020 | Kwon | H01M 4/0404 |
| 2021/0104750 A1* | 4/2021 | Ito | H01M 4/366 |
| 2021/0135278 A1* | 5/2021 | Kim | H01M 4/382 |

FOREIGN PATENT DOCUMENTS

| | | | | |
|---|---|---|---|---|
| CN | 104969400 A | 10/2015 | | |
| CN | 105308776 A | 2/2016 | | |
| EP | 3 136 477 A1 | 3/2017 | | |
| JP | 2014-183043 A | 9/2014 | | |
| JP | 2015-46220 A | 3/2015 | | |
| JP | 2016-225187 A | 12/2016 | | |
| KR | 10-2006-0067459 A | 6/2006 | | |
| KR | 10-878718 B1 | 1/2009 | | |
| KR | 10-2013-0017341 A | 2/2013 | | |
| KR | 10-2015-0071453 A | 6/2015 | | |
| KR | 10-1558774 B1 | 10/2015 | | |
| KR | 10-2016-0073870 A | 6/2016 | | |
| KR | 10-2017-0109293 A | 9/2017 | | |
| KR | 10-2017-0111743 A | 10/2017 | | |
| WO | WO 2017/171409 A1 | 10/2017 | | |
| WO | WO-2018179817 A1 * | 10/2018 | ......... H01M 4/0404 | |
| WO | WO-2019022044 A * | 1/2019 | ......... H01M 10/052 | |
| WO | WO-2019022044 A1 * | 1/2019 | ......... H01M 10/052 | |

OTHER PUBLICATIONS

Chang, J., Huang, X., Zhou, G., Cui, S., Hallac, P.B., Jiang, J., Hurley, P.T. and Chen, J. (2014), Multilayered Si Nanoparticle/Reduced Graphene Oxide Hybrid as a High-Performance Lithium-Ion Battery Anode. Adv. Mater., 26: 758-764. https://doi.org/10.1002/adma.201302757 (Year: 2013).*

Extended European Search Report for European Application No. 18869253.7, dated Oct. 30, 2020.

International Search Report (PCT/ISA/210) issued in PCT/KR2018/011987, dated Mar. 13, 2019.

* cited by examiner

NEGATIVE ELECTRODE FOR LITHIUM SECONDARY BATTERY AND LITHIUM SECONDARY BATTERY COMPRISING THE SAME

CROSS-REFERENCE TO RELATED APPLICATION

This application claims priority to and the benefit of Korean Patent Application No. 10-2017-0134055, filed on Oct. 16, 2017, the disclosure of which is incorporated herein by reference in its entirety.

TECHNICAL FIELD

Technical Field

The present invention relates to a negative electrode for a lithium secondary battery, a lithium secondary battery comprising the same, and a method of manufacturing the same, and more particularly, a negative electrode for a lithium secondary battery, which has no deformation of a surface of the negative electrode during pre-lithiation because a negative electrode active material layer comprising a negative electrode active material exhibiting a uni-modal particle diameter distribution is formed, and a lithium secondary battery comprising the negative electrode.

Background Art

As technology development and demand for mobile devices are increasing, the demand for secondary batteries as energy sources is rapidly increasing. Among such secondary batteries, lithium secondary batteries, which exhibit high energy density and operating potential and have a long cycle life and a low self-discharge rate, are commercialized and widely used.

Recently, as there is a growing interest in environmental issues, research has been carried out on electric vehicles (EVs) and hybrid electric vehicles (HEVs) which can replace fossil-fueled vehicles, which are the major causes of air pollution, such as gasoline vehicles and diesel vehicles. Although a nickel-metal hydride (Ni-MH) secondary battery is mainly used as a power source for EVs and HEVs, research is being actively carried out on the use of a lithium secondary battery having a high energy density, a high discharge voltage, and output stability, and some of the lithium secondary batteries are commercialized.

As a negative electrode active material constituting a negative electrode of a lithium secondary battery, metal lithium, a carbon-based material such as graphite or activated carbon, or a material such as silicon oxide ($SiO_x$) is used. Recently, the carbon-based material is mainly used as the negative electrode active material. However, in the case of the carbon-based material, a theoretical capacity is merely about 400 mAh/g such that there is a disadvantage in that a capacity is small.

Therefore, in order to increase an energy density, attempts have been made to use silicon (Si) or a lithium metal having a high theoretical capacity (4,200 mAh/g), but there is a situation in which there are difficulties such as a high irreversible capacity, a high volume expansion rate, dendrite formation. Consequently, an active material having a high volume expansion rate but a high capacity is used by mixing them with a carbon-based active material.

Since the active material having a high capacity has a high irreversible capacity, it is required to improve initial irreversibility. One of the methods is to perform pre-lithiation before manufacturing a lithium secondary battery to allow the active material to undergo a side reaction occurring during a first charging in advance. As described above, when the pre-lithiation is performed, a first cycle proceeds in a state in which irreversibility is reduced as much as when charging or discharging is performed on an actually manufactured secondary battery such that there is an advantage in that initial irreversibility can be reduced.

Examples of pre-lithiation methods may comprise a method in which lithium is deposited on a surface of a negative electrode and then a battery is assembled and an electrolyte is injected into the battery, thereby performing lithiation during a wetting process, and a method in which a negative electrode is wetted by being immersed in an electrolyte and then lithium is brought into direct contact with the negative electrode. However, in the case of a negative electrode containing a mixed negative electrode active material obtained by mixing a carbon-based active material with an active material having a high volume expansion rate and a high capacity as a negative electrode active material, materials having different volume expansion rates due to capacity and swelling are included such that, during pre-lithiation, bending and deformation may occur at a surface of the negative electrode due to the different volume expansion rates, thereby adversely affecting a battery assembling process and cell performance.

DISCLOSURE OF THE INVENTION

Technical Problem

The present invention is directed to providing a negative electrode for a lithium secondary battery, in which deformation does not occur at a surface of the negative electrode surface during pre-lithiation.

The present invention is also directed to providing a lithium secondary battery comprising the negative electrode for a lithium secondary battery.

Technical Solution

One aspect of the present invention provides a negative electrode for a lithium secondary battery, which comprises a negative electrode current collector, a first negative electrode active material layer present on the negative electrode current collector, and a second negative electrode active material layer present on the first negative electrode active material layer, wherein the first negative electrode active material layer comprises two or more kinds of first negative electrode active materials, and the second negative electrode active material layer comprises a second negative electrode active material having an average particle diameter $D_{50}$ of 0.1 μm to 10 μm and the second negative electrode active material having a uni-modal particle diameter distribution.

Another aspect of the present invention provides a lithium secondary battery comprising the above-described negative electrode for a lithium secondary battery.

Advantageous Effects

A negative electrode for a lithium secondary battery according to exemplary embodiments of the present invention has a negative electrode active material layer comprising a negative electrode active material exhibiting a uni-modal particle diameter distribution formed at a surface of the negative electrode such that bending or deformation does not occur at the surface of the negative electrode during pre-lithiation and thus the lithium secondary battery can exhibit improved performance.

BEST MODE FOR CARRYING OUT THE INVENTION

Figure 1:
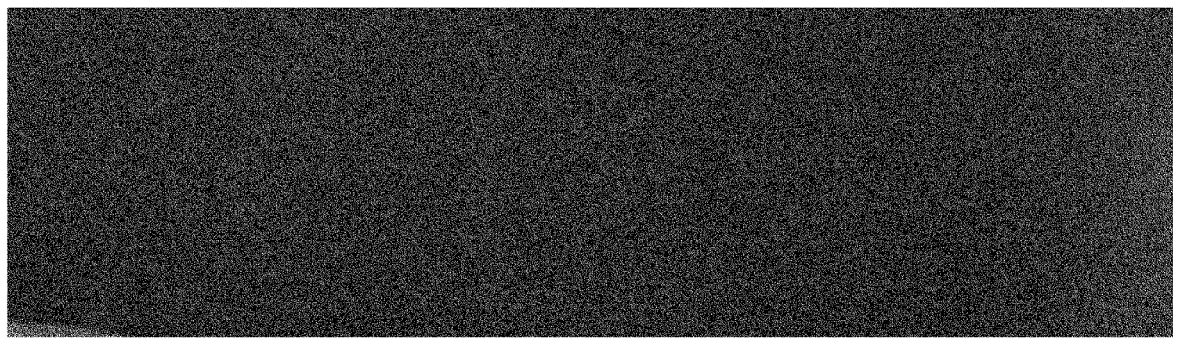
FIG. 1 is a photograph capturing a surface state of the negative electrode manufactured in Example 4 after pre-lithiation is performed on the negative electrode.

Hereinafter, the present invention will be described in more detail for helping to understand the present invention.

Terms or words used herein and the appended claims should not be construed as being limited to ordinary or dictionary meanings and should be construed in accordance with the meaning and concept consistent with the technical spirit of the present invention according to the principle in that inventors can properly define the concept of the terms in order to describe their invention with the best manner.

A negative electrode for a lithium secondary battery according to the present invention comprises a negative electrode current collector, a first negative electrode active material layer present on the negative electrode current collector, and a second negative electrode active material layer present on the first negative electrode active material layer. The first negative electrode active material layer comprises two or more kinds of negative electrode active materials, and the second negative electrode active material layer comprises a negative electrode active material having an average particle diameter $D_{50}$ in the range of 0.1 μm to 10 μm and exhibiting a uni-modal particle diameter distribution.

The first negative electrode active material layer comprises two or more kinds of negative electrode active materials. Specifically, at least one of the two or more kinds of negative electrode active materials may be a negative electrode active material having a high theoretical capacity. The first negative electrode active material layer may comprise a negative electrode active material having a large capacity to allow the negative electrode to exhibit a high capacity characteristic. Further, the first negative electrode active material layer may comprise a negative electrode active material having a small volume variation during charging or discharging and having high electrical conductivity. When the first negative electrode active material layer comprises a negative electrode active material having a large capacity and a negative electrode active material having a small volume variation during charging or discharging, the negative electrode active material having a large capacity increases a capacity of the negative electrode, whereas the negative electrode active material having a small volume variation during charging or discharging may prevent the swelling of the first negative electrode active material layer from becoming larger than a predetermined level such that a structure of the negative electrode may be maintained.

When the first negative electrode active material layer comprises a negative electrode active material having a large capacity and a negative electrode active material having small swelling, a weight ratio of the negative electrode active material having a large capacity to the negative electrode active material having small swelling may be in the range of 5:95 to 40:60, specifically, in the range of 10:90 to 35:65, and more specifically, in the range of 10:90 to 30:70. When the negative electrode active material having a large capacity and the negative electrode active material having small swelling are mixed in the above-described weight ratio range, the negative electrode may exhibit an excellent capacity characteristic as well as an excellent lifetime characteristic. Since a capacity of the negative electrode active material and a swelling characteristic of the negative electrode active material generally have a proportional relationship, when the negative electrode active material having a large capacity occupies an excessively large amount in a total negative electrode active material fraction, degradation of a lifetime characteristic is caused so that an electrode structure may be appropriately maintained by limiting an amount of the negative electrode active material having a large capacity to a range for complementing an energy density.

In the negative electrode for a lithium secondary battery according to the present invention, the second negative electrode active material layer located at a surface portion of the negative electrode has an average particle diameter $D_{50}$ in the range of 0.1 μm to 10 μm and comprises a negative electrode active material exhibiting a uni-modal particle diameter distribution. The second negative electrode active material layer may smoothly receive lithium ions from a lithium metal which is brought into contact with the second negative electrode active material layer during pre-lithiation, thereby allowing the lithium ions to be uniformly diffused into the negative electrode active material layer.

Similar to a short-circuit concept of the negative electrode during pre-lithiation, a lithium metal is brought into direct contact with the negative electrode active material without a separator so that the lithium metal reacts with the negative electrode with a very high C-rate. When a negative electrode active material having a large capacity and a negative electrode active material having a small capacity are mixed in the negative electrode active material layer of the negative electrode, and the lithium metal is brought into contact with the negative electrode to react therewith with a very high C-rate, there occurs a difference in volumetric expansion between the negative electrode active material having the large capacity and the negative electrode active material having the small capacity. Accordingly, in the negative electrode for a lithium secondary battery according to the present invention, the second negative electrode active material layer comprising a negative electrode active material having an average particle diameter $D_{50}$ in the range of 0.1 μm to 10 μm and exhibiting a uni-modal particle diameter distribution is formed on the first negative electrode active material layer comprising two or more kinds of negative electrode active materials such that the second negative electrode active material layer may uniformly receive lithium ions to solve a non-uniformity problem due to a difference in volumetric expansion between two or more kinds of negative electrode active materials included in the first negative electrode active material layer, and the lithium ions may be uniformly diffused into the entirety of the negative electrode active material layer of the negative electrode.

The second negative electrode active material layer may comprise a negative electrode active material having an average particle diameter $D_{50}$ in the range of 0.1 μm to 10 μm. Specifically, the average particle diameter $D_{50}$ of the negative electrode active material may be in the range of 1 μm to 10 μm, and more specifically, in the range of 5 μm to 8 μm. When the second negative electrode active material layer comprises the negative electrode active material having the above-described average particle diameter $D_{50}$, the second negative electrode active material may be formed with a more uniform thickness.

Further, the second negative electrode active material layer comprises a negative electrode active material exhibiting a uni-modal particle diameter distribution to allow lithium ions to be uniformly transferred from the lithium metal and minimize a structural deformation of the surface of the second negative electrode active material layer due to a variation in volume of the negative electrode active material. Specifically, in the negative electrode for a lithium secondary battery according to the example of the present invention, unlike a general negative electrode active material having a Gaussian particle size distribution, the second negative electrode active material layer comprises a negative electrode active material having a uni-modal particle size distribution satisfying $D_{min}/D_{max} \geq 0.5$, and specifically, $D_{min}/D_{max} \geq 0.45$. Further, the negative electrode active material included in the second negative electrode active material layer may satisfy a condition of $D_{max}-D_{min}<10$ μm, and specifically, $D_{max}-D_{min}<8$ μm.

The second negative electrode active material layer comprises a negative electrode active material exhibiting a uni-modal particle diameter distribution to receive lithium ions prior to the two or more kinds of negative electrode active materials included in the first negative electrode active material layer, thereby primarily relieving an irreversible capacity and receiving a charging capacity of a high C-rate. Then, the second negative electrode active material layer transfers the lithium ions to the first negative electrode active material layer with a low diffusion rate such that the first negative electrode active material layer and the second negative electrode active material layer may more appropriately maintain structures thereof.

The second negative electrode active material layer may comprise one kind of negative electrode active material as the negative electrode active material. When the second negative electrode active material layer comprises only one kind of negative electrode active material, a volumetric expansion of the negative electrode active material included in the negative electrode active material layer is entirely uniform such that the second negative electrode active material layer may uniformly transfer lithium ions to the first negative electrode active material layer while maintaining a structure of the second negative electrode active material layer, thereby minimizing deformation of an electrode.

The second negative electrode active material layer may have a thickness in the range of 5% to 50%, specifically in the range of 10% to 20%, and more specifically in the rage of 10% to 15% with respect to a thickness of the first negative electrode active material layer. When the thickness of the second negative electrode active material layer satisfies the above-described range, the second negative electrode active material layer may receive lithium ions during pre-lithiation to uniformly diffuse the lithium ions while minimizing the structural deformation of a surface of the negative electrode. The second negative electrode active material layer may receive an appropriate amount of the lithium ions capable of complementing an irreversible capacity of the negative electrode active material, and specifically an irreversible capacity of the negative electrode active material included in the first negative electrode active material layer. Further, the second negative electrode active material layer may comprise a negative electrode active material having swelling that is smaller than that of the first negative electrode active material layer. The negative electrode active material having small swelling may have a relatively small capacity and thus, when the thickness of the second negative electrode active material layer is greater than the above-described range, an overall capacity of the electrode may be reduced so that it is more preferable that the thickness of the second negative electrode active material layer satisfies the above-described range.

In the negative electrode for a lithium secondary battery according to the example of the present invention, the first negative electrode active material layer may comprise a carbon-based negative electrode active material together with a negative electrode active material exhibiting a high capacity, as the negative electrode active material. Specifically, the first negative electrode active material layer may comprise a carbon-based negative electrode active material and a mixture of one or more selected from the group consisting of Si, particles of silicon oxide ($SiO_x$) ($0<x\leq2$), a Si-metal alloy, and a Si-carbon composite, as the negative electrode active material.

Alternatively, the second negative electrode active material layer may comprise a carbon-based negative electrode active material as the negative electrode active material.

For example, the carbon-based negative electrode active material may comprise natural graphite, Kish graphite, pyrolytic carbon, a mesophase pitch-based carbon fiber, a mesocarbon microbead, mesophase pitch, soft carbon, hard carbon, non-graphitizable carbon, graphitizable carbon, and high-temperature baked carbon such as petroleum or coal tar pitch derived cokes.

In the negative electrode for a lithium secondary battery according to the example of the present invention, a plurality of negative electrode active material layers are formed on a surface of a negative electrode current collector, a second negative electrode active material layer located at a surface layer has an average particle diameter $D_{50}$ in the range of 1 μm to 10 μm, and a negative electrode active material exhibits a uni-modal particle diameter distribution such that the second negative electrode active material layer may help maintain an overall structure of the electrode. During charging or discharging, and particularly, during pre-lithiation, a structure of the negative electrode for a lithium secondary battery according to the present invention is appropriately maintained so that, in all cases of pre-lithiation through a method of immersing the negative electrode in an electrolyte after lithium is deposited on the negative electrode and a method of bringing the negative electrode into direct contact with lithium after the negative electrode immersed in an electrolyte, the structure of the negative electrode is appropriately maintained. Further, since the second negative electrode active material layer undergoing small deformation during pre-lithiation is brought into contact with the lithium, the lithium is stably brought into contact with the second negative electrode active material layer, and the second negative electrode active material layer receives lithium ions due to diffusion of the lithium ions into the negative electrode active material layer of the negative electrode such that more excellent pre-lithiation efficiency may be exhibited.

In an example of the present invention, the negative electrode for a lithium secondary battery may comprise a lithium metal layer for pre-lithiation. That is, the negative electrode for a lithium secondary battery according to the present invention may further comprise a lithium metal layer formed on the second negative electrode active material layer.

For example, the lithium metal layer may be deposited and formed by physical vapor deposition (PVD) or chemical vapor deposition (CVD), which comprises sputtering, electron (E)-beam, evaporation, or thermal evaporation.

When an electrode assembly is manufactured using the negative electrode for a lithium secondary battery and then an electrolyte is injected into the electrode assembly, the lithium metal layer supplies lithium ions to the second negative electrode active material layer due to diffusion so that an amount of lithium ions capable of compensating for an irreversible capacity of the negative electrode may be included in the negative electrode active material layers of the negative electrode.

As described above, the negative electrode for a lithium secondary battery of the present invention may exhibit excellent pre-lithiation efficiency and may be used in a lithium secondary battery in which pre-lithiation is performed. Consequently, the negative electrode for a lithium secondary battery according to an example of the present invention may comprise lithium ions diffused due to pre-lithiation.

After pre-lithiation is performed, when an area of the negative electrode for a lithium secondary battery according to the example of the present invention is divided into three or more regions, and specifically five or more regions, and then a discharge capacity of each of the divided regions is measured, a maximum deviation in discharge capacity between the divided regions may be in the range of 0.1% to 15%, specifically 0.1% to 10%, and more specifically 0.1% to 5%. After pre-lithiation is performed, when the negative electrode for a lithium secondary battery according to the example of the present invention is punched into an area in the range of 0.7 cm$^2$ to 12 cm$^2$ at five or more arbitrary positions, and then a discharge capacity of each of the punched out areas is measured, a maximum deviation in discharge capacity between the divided regions may be in the range of 0.1% to 15%, specifically 0.1% to 10%, and more specifically 0.1% to 5%. In the negative electrode for a lithium secondary battery according to the example of the present invention, the second negative electrode active material layer comprising a negative electrode active material, which has an average particle diameter D$_{50}$ in the range of 0.1 µm to 10 µm and exhibits a uni-modal particle diameter distribution, is formed on the first negative electrode active material layer comprising two or more kinds of negative electrode active materials. Consequently, the second negative electrode active material layer uniformly receives lithium ions from the lithium metal during pre-lithiation to transfer the lithium ions to the first negative electrode active material layer with a low diffusion rate such that the first negative electrode active material layer and the second negative electrode active material layer may more appropriately maintain the structures thereof, and pre-lithiation may be uniformly performed on the entire negative electrode.

The negative electrode may be manufactured by a conventional method known in the art. For example, the negative electrode may be manufactured such that a negative electrode active material and additives, such as a binder, a conductive material, and the like, which are included in the first negative electrode layer and the second negative electrode layer, are mixed and stirred to prepare respective negative electrode slurries, the negative electrode slurry of a first negative electrode layer is applied onto a current collector and is dried, and then the negative electrode slurry of a second negative electrode layer is applied onto the first negative electrode layer and is dried and pressed.

Examples of a solvent for forming the negative electrode may comprise organic solvents such as N-methylpyrrolidone (NMP), dimethylformamide (DMF), acetone, and dimethylacetamide, or water. These solvents may be used alone or in a mixture of two or more thereof. A use amount of the solvent is sufficient for being able to dissolve and disperse the negative electrode active material, the binder, and the conductive material in consideration of application thicknesses of the slurries and a production yield.

The binder may be used to bind particles of the negative electrode active material and maintain the formed body, and the binder is not particularly limited as long as it is a conventional binder used in preparation of a slurry for a negative electrode active material. For example, the binder may comprise polyvinyl alcohol, carboxymethylcellulose, hydroxypropylene cellulose, diacetylene cellulose, polyvinyl chloride, polyvinyl pyrrolidone, polytetrafluoroethylene (PTFE), polyvinylidene fluoride (PVDF), polyethylene, polypropylene, or the like, which is a non-aqueous binder. Further, the binder may comprise one selected from the group consisting of acrylonitrile-butadiene rubber, styrene-butadiene rubber, and acrylic rubber, which are aqueous binders, or a mixture of two or more thereof. As compared with the non-aqueous binder, the aqueous binder is economical, eco-friendly, harmless to the health of workers and has an excellent binding effect, and thus the aqueous binder may increase a proportion of an active material in the same volume to achieve a high capacity. Preferably, styrene-butadiene rubber may be used as the aqueous binder.

The binder may be included in an amount of 10 wt % or less, and specifically in the range of 0.1 wt % to 10 wt % with respect to the total weight of the slurry for the negative electrode active material. When a content of the binder is less than 0.1 wt %, an effect according to the use of the binder is insignificant and thus it is not preferable, whereas when the content of the binder exceeds 10 wt %, there may be a concern that a capacity per volume is reduced due to a relative reduction of the negative electrode active material according to an increase in content of the binder and thus it is not preferable.

The conductive material is not particularly limited as long as it has electrical conductivity without causing a chemical change in a battery. Examples of the conductive material may comprise graphite such as natural graphite, artificial graphite, or the like, carbon black such as acetylene black, Ketjen black, channel black, furnace black, lamp black, thermal black, or the like, a conductive fiber such as a carbon fiber, a metal fiber, or the like, a metal powder such as a carbon fluoride powder, an aluminum powder, a nickel powder, or the like, a conductive whisker such as a zinc oxide whisker, a potassium titanate whisker, or the like, a conductive metal oxide such as a titanium oxide or the like, and a conductive material such as a polyphenylene derivative or the like. The conductive material may be used in an amount of 1 wt % to 9 wt % with respect to the total weight of the slurry for the negative electrode active material.

The negative electrode current collector used for the negative electrode according to one embodiment of the present invention may have a thickness in the range of 3 µm to 500 µm. Any material may be used as a material of the negative electrode current collector without limitation as long as it has electrical conductivity without causing a chemical change in the battery. For example, copper, stainless steel, aluminum, nickel, titanium, baked carbon, copper or stainless steel having a surface treated with carbon, nickel, titanium, silver, or the like, an aluminum-cadmium alloy, or the like may be used. Further, fine irregularities may be formed on a surface of the negative electrode current collector to enhance a bonding force of the negative electrode active material, and the negative electrode current collector may be used in various forms such as a film, a sheet, a foil, a net, a porous material, a foam, and a nonwoven fabric.

The present invention also provides a lithium secondary battery comprising a negative electrode and a positive electrode for the lithium secondary battery, and a separator interposed between the negative electrode and the positive electrode.

The positive electrode may be manufactured by a conventional method known in the art. For example, the positive electrode may be manufactured by mixing and stirring a solvent, and as necessary, a binder, a conductive material, and a dispersant with a positive electrode active material to prepare a slurry and then applying (coating) the slurry on a current collector made of a metal material and then drying and pressing.

The current collector made of a metal material is a metal which has high conductivity and to which the slurry of the positive electrode active material may be easily adhered. Any material may be used without limitation as a material of the current collector as long as the material has high conductivity without causing a chemical change in the battery in a voltage range of the battery. For example, stainless steel, aluminum, nickel, titanium, baked carbon, aluminum or stainless steel having a surface treated with carbon, nickel, titanium, silver, or the like, or the like may be used. Further, fine irregularities may be formed on a surface of the collector to enhance a bonding force of the positive electrode active material. The current collector may be used in various forms such as a film, a sheet, a foil, a net, a porous material, a foam, and a nonwoven fabric and may have a thickness in the range of 3 μm to 500 μm.

For example, the positive electrode active material may be a layered compound such as lithium cobalt oxide [$Li_xCoO_2$ ($0.5<x<1.3$)] or a lithium nickel oxide [$Li_xNiO_2$ ($0.5<x<1.3$)], or a compound substituted with an additional transition metal; a lithium manganese oxide represented by a formula [$Li_{1+x}Mn_{2-x}O_4$ (herein, x is in the range of 0 to 0.33)], $LiMnO_3$, $LiMn_2O_3$, or a formula [$LixMnO_2$ ($0.5<x<1.3$)]; a lithium copper oxide ($Li_2CuO_2$); a vanadium oxide such as $LiV_3O_8$, $LiFe_3O_4$, $V_2O_5$, or $Cu_2V_2O_7$; a Ni-site type lithium nickel oxide represented by a formula [$LiNi_{1-x}M_xO_2$ (herein, M=Co, Mn, Al, Cu, Fe, Mg, B, or Ga, and x is in the range of 0.01 to 0.3)]; a lithium manganese composite oxide represented by a formula [$LiMn_{2-x}M_xO_2$ (herein, M=Co, Ni, Fe, Cr, Zn, or Ta, and x is in the range of 0.01 to 0.1)] or a formula [$Li_2Mn_3MO_8$ (herein, M=Fe, Co, Ni, Cu, or Zn)]; $LiMn_2O_4$ in which a part of Li in a formula is substituted with an alkaline earth metal ion; a disulfide compound; $Fe_2(MoO_4)_3$, and the like.

Examples of a solvent for forming the positive electrode may comprise organic solvents such as NMP, DMF, acetone, and dimethylacetamide, or water. These solvents may be used alone or in a mixture of two or more thereof. A use amount of the solvent is sufficient for being able to dissolve and disperse the positive electrode active material, the binder, and the conductive material in consideration of application thicknesses of the slurries and a production yield.

Various kinds of binder polymers may be used as the binder, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, poly acrylic acid, a polymer in which hydrogen thereof is substituted with Li, Na, or Ca, and various copolymers.

The conductive material is not particularly limited as long as it has electrical conductivity without causing a chemical change in a battery. Examples of the conductive material may comprise graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a conductive tube such as a carbon nano tube or the like; a metal powder such as a carbon fluoride powder, an aluminum powder, a nickel powder, or the like; a conductive whisker such as a zinc oxide whisker, a potassium titanate whisker, or the like; a conductive metal oxide such as titanium oxide or the like; and a conductive material such as a polyphenylene derivative or the like. The conductive material may be used in an amount of 1 wt % to 20 wt % with respect to the total weight of the positive electrode slurry.

An aqueous dispersant or an organic dispersant such as N-methyl-2-pyrrolidone may be used as the dispersant.

Further, a general porous polymer film conventionally used as a separator, e.g., a porous polymer film prepared with a polyolefin-based polymer such as an ethylene homopolymer, a propylene homopolymer, an ethylene-butene copolymer, an ethylene-hexene copolymer, or an ethylene-methacrylate copolymer, may be used alone as the separator or may be stacked to be used as the separator. Alternatively, a conventional porous non-woven fabric, e.g., a non-woven fabric made of glass fibers having a high melting point or polyethylene terephthalate fiber, may be used as the separator, but the present invention is not limited thereto.

A lithium salt includible as the electrolyte used in the present invention may be used without limitation as long as it is conventionally used as an electrolyte for a lithium secondary battery. For example, an anion of the lithium salt may comprise one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte used in the present invention, an organic solvent included in the electrolytic solution may be used without limitation as long as it is conventionally used in an electrolyte for a secondary battery. The organic solvent may comprise one selected from the group consisting of propylene carbonate (PC), ethylene carbonate (EC), diethyl carbonate (DEC), dimethyl carbonate (DMC), ethyl-methyl carbonate (EMC), methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran, or a mixture of two or more thereof. Specifically, EC and PC, which are cyclic carbonates among the carbonate-based organic solvents, may be preferably used because EC and PC are high viscosity organic solvents and have high dielectric constants to easily dissociate the lithium salt in the electrolyte. When DMC and DEC, which are linear carbonates having low viscosity and low dielectric constants, are used by being mixed with the cyclic carbonates at an appropriate ratio, an electrolyte having high electric conductivity may be obtained such that DMC and DEC may be used more preferably. In particular, the lithium secondary battery comprising the negative electrode active material for a lithium secondary battery of the present invention has an excellent resistance property against propylene carbonate by comprising the graphite having a surface on which an alkali carbonate layer is formed so that the lithium secondary battery may preferably comprise the above-described propylene carbonate so as to exhibit excellent low-temperature performance.

Alternatively, the electrolyte stored according to the present invention may further comprise an additive such as an overcharge inhibitor or the like included in a conventional electrolyte.

An exterior of the lithium secondary battery of the present invention is not particularly limited, and the exterior thereof may be a cylindrical shape using a can, a square shape, a pouch shape, a coin shape, or the like.

The lithium secondary battery according to the present invention may be used not only in a battery cell used as a power source of a small-sized device but also as a unit cell in a middle- or large-sized battery module comprising a plurality of battery cells.

Preferable examples of middle- or large-sized devices comprise electric vehicles, hybrid electric vehicles, plug-in hybrid electric vehicles, and electric power storage systems, but the present invention is not limited thereto.

MODE FOR CARRYING OUT THE INVENTION

Examples

Hereinafter, the present invention will be described in more detail with reference to examples and experimental examples, but the present invention is not limited by these examples and experimental examples. The examples of the present invention may be modified in various forms, and the scope of the present invention should not be construed as being limited to the examples described in detail below. The examples of the present invention are provided to more fully describe the present invention to those skilled in the art.

Example 1

<Manufacture of Negative Electrode>
94 wt % of a negative electrode active material of silicon oxide and natural graphite, each having an average particle diameter $D_{50}$ of about 5 μm, in a weight ratio of 30:70, 1 wt % of carbon black (a conductive material), 3 wt % of SBR (a binder), and 2 wt % of CMC (a thickener) were added to water to prepare a slurry for a first negative electrode.

94 wt % of artificial graphite having an average particle diameter $D_{50}$ of 5 μm, a $D_{min}$ of 3.5 μm, a $D_{max}$ of 6.5 μm, and a uni-modal particle diameter distribution, 1 wt % of carbon black (a conductive material), 3 wt % of SBR (a binder), and 2 wt % of CMC (a thickener) were added to water to prepare a slurry for a second negative electrode.

One surface of a copper current collector was coated with the prepared slurry for the first negative electrode with a thickness of 100 μm and was dried to form a first negative electrode active material layer. After the first negative electrode active material layer was formed on the copper current collector, the first negative electrode active material layer was coated with the prepared slurry for the second negative electrode with a thickness of 10 μm and was dried to form a second negative electrode active material layer. The first negative electrode active material layer and the second negative electrode active material layer were rolled to prepare a negative electrode.

Example 2

A negative electrode was manufactured in the same manner as in Example 1, except that the second negative electrode active material layer was applied with a thickness of 5 μm.

Example 3

A negative electrode was manufactured in the same manner as in Example 1, except that the second negative electrode active material layer was applied with a thickness of 50 μm.

Examples 4 to 6

<Manufacture of Negative Electrode Having Deposited Lithium Metal Layer>
A lithium metal layer was formed on the second negative electrode active material layer of each of the negative electrodes manufactured in Examples 1 to 3 through PVD. A lithium metal which was a raw material for deposition was put in a thermal evaporator and a lithium metal layer comprising the lithium metal was formed on the second negative electrode active material layer with thickness of 5 μm through thermal evaporation.

Comparative Example 1

<Manufacture of Negative Electrode>
94 wt % of a negative electrode active material mixed with silicon oxide and natural graphite, each having an average particle diameter $D_{50}$ of about 5 μm, in a weight ratio of 30:70, 1 wt % of carbon black (a conductive material), 3 wt % of SBR (a binder), and 2 wt % of CMC (a thickener) were added to water to prepare a slurry for a negative electrode.

One surface of a copper current collector was coated with the prepared slurry for the negative electrode with a thickness of 110 μm and was dried to form a negative electrode active material layer. The negative electrode active material layer was rolled to prepare a negative electrode.

Comparative Example 2

<Manufacture of Negative Electrode>
94 wt % of a negative electrode active material of silicon oxide and natural graphite, each having an average particle diameter $D_{50}$ of about 5 μm, in a weight ratio of 30:70, 1 wt % of carbon black (a conductive material), 3 wt % of SBR (a binder), and 2 wt % of CMC (a thickener) were added to water to prepare a slurry for a first negative electrode.

94 wt % of artificial graphite having an average particle diameter $D_{50}$ of 5 μm, a $D_{min}$ of 1 μm, a $D_{max}$ of 60 μm, and a Gaussian particle diameter distribution, 1 wt % of carbon black (a conductive material), 3 wt % of SBR (a binder), and 2 wt % of CMC (a thickener) were added to water to prepare a slurry for a second negative electrode.

One surface of a copper current collector was coated with the prepared slurry for the first negative electrode with a thickness of 100 μm and was dried to form a first negative electrode active material layer. After the first negative electrode active material layer was formed on the copper current collector, the first negative electrode active material layer was coated with the prepared slurry for the second negative electrode with a thickness of 10 μm and was dried to form a second negative electrode active material layer. The first negative electrode active material layer and the second negative electrode active material layer were rolled to prepare a negative electrode.

Comparative Example 3

94 wt % of a negative electrode active material comprising silicon oxide with an average particle diameter $D_{50}$ of about 5 μm, 1 wt % of carbon black (a conductive material), 3 wt % of SBR (a binder), and 2 wt % of CMC (a thickener) were added to water to prepare a slurry for a first negative electrode.

94 wt % of artificial graphite having an average particle diameter $D_{50}$ of 5 μm, a $D_{min}$ of 1 μm, a $D_{max}$ of 60 μm, and a Gaussian particle diameter distribution, 1 wt % of carbon black (a conductive material), 3 wt % of SBR (a binder), and 2 wt % of CMC (a thickener) were added to water to prepare a slurry for a second negative electrode.

One surface of a copper current collector was coated with the prepared slurry for the first negative electrode with a thickness of 100 μm and was dried to form a first negative electrode active material layer. After the first negative electrode active material layer was formed on the copper current collector, the first negative electrode active material layer was coated with the prepared slurry for the second negative electrode with a thickness of 10 μm and was dried to form a second negative electrode active material layer. The first negative electrode active material layer and the second negative electrode active material layer were rolled to prepare a negative electrode.

Comparative Example 4

94 wt % of a negative electrode active material mixed with silicon oxide and natural graphite, each having an average particle diameter $D_{50}$ of about 5 μm, in a weight ratio of 30:70, 1 wt % of carbon black (a conductive material), 3 wt % of SBR (a binder), and 2 wt % of CMC (a thickener) were added to water to prepare a slurry for a first negative electrode.

94 wt % of a negative electrode active material mixed with silicon oxide having an average particle diameter $D_{50}$ of about 5 μm and artificial graphite having a $D_{min}$ of 1 μm, a $D_{max}$ of 60 μm, and a Gaussian particle diameter distribution in a weight ratio of 30:70, 1 wt % of carbon black (a conductive material), 3 wt % of SBR (a binder), and 2 wt % of CMC (a thickener) were added to water to prepare a slurry for a second negative electrode.

One surface of a copper current collector was coated with the prepared slurry for the first negative electrode with a thickness of 100 μm and was dried to form a first negative electrode active material layer. After the first negative electrode active material layer was formed on the copper current collector, the first negative electrode active material layer was coated with the prepared slurry for the second negative electrode with a thickness of 10 μm and was dried to form a second negative electrode active material layer. The first negative electrode active material layer and the second negative electrode active material layer were rolled to prepare a negative electrode.

Comparative Examples 5 to 8

<Manufacture of Negative Electrode Having Deposited Lithium Metal Layer>

A lithium metal layer was formed in the same manner as in Example 4, except that the negative electrode manufactured in each of Comparative Examples 1 to 4 was used instead of the negative electrode manufactured in each of Examples 1 to 3.

Experimental Example 1

Figure 2:
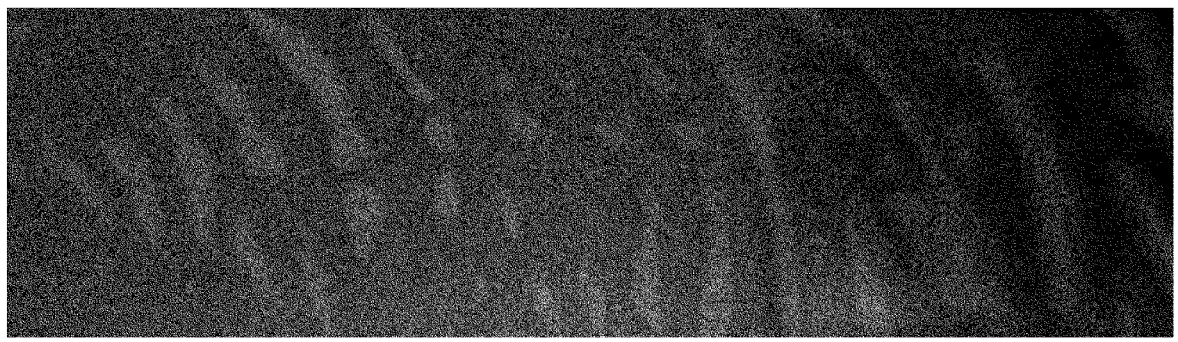
FIG. 2 is a photograph capturing a surface state of the negative electrode manufactured in Comparative Example 5 after pre-lithiation is performed on the negative electrode.

The negative electrode manufactured in each of Example 4 and Comparative Example 5 was immersed in an electrolyte solution in which 1 M $LiPF_6$ was dissolved in a solvent in which EC and DEC were mixed in a volume ratio of 30:70, a surface of the negative electrode was observed after 30 minutes, and the results are respectively shown in FIGS. 1 and 2.

Referring to FIGS. 1 and 2, can be confirmed that any particular variation did not occur at the surface of the negative electrode of Example 4 after immersion in the electrolyte, whereas bending occurred at the surface of the negative electrode of Comparative Example 5 after immersion in the electrolyte.

During pre-lithiation after immersion in the electrolyte, in the negative electrode of Example 4 shown in FIG. 1, the second negative electrode active material layer uniformly received lithium ions to transfer the lithium ions to the first negative electrode active material layer with a low diffusion rate such that both of the silicon oxide and the natural graphite included in the first negative electrode active material layer were uniformly pre-lithiated and thus there is no variation at the surface of the negative electrode. However, during pre-lithiation after immersion in the electrolyte, in the negative electrode of Comparative Example 5 shown in FIG. 2, since a second negative electrode active material layer were not present and thus the lithium ions were directly diffused into the silicon oxide and the natural graphite of the negative electrode active material layer, the silicon oxide having a large capacity received a relatively large amount of the lithium ions compared to the natural graphite having a small capacity and a volume of the silicon oxide was significantly increased such that the bending occurred at the surface of the negative electrode. This can be confirmed through spots on the photograph.

Experimental Example 2

The negative electrode manufactured in each of Example 4 and Comparative Examples 5 and 6 was immersed in an electrolytic solution, in which 1 M $LiPF_6$ was dissolved in a solvent in which EC and DEC were mixed in a volume ratio of 30:70, for 30 minutes to be pre-lithiated, and then the negative electrode was punched into a coin cell size (an area is 1.4875 $cm^2$) at five arbitrary positions on an entire area of the negative electrode to measure a discharge capacity. Here, in Comparative Examples 5 and 6, the samples were collected so as to comprise as many concave and convex portions of the negative electrode as possible. The results were shown in the following Table 1.

TABLE 1

|  | Example 4 (mAh/g) | Comparative Example 5 (mAh/g) | Comparative Example 6 (mAh/g) |
|---|---|---|---|
| Position 1 | 550 | 383 | 437 |
| Position 2 | 555 | 774 | 582 |
| Position 3 | 552 | 473 | 488 |
| Position 4 | 558 | 455 | 531 |
| Position 5 | 561 | 632 | 577 |

Referring to Table 1, it can be seen that the negative electrode of Example 4 was uniformly pre-lithiated over the entire area thereof because there was no variation in discharge capacity between portions of the negative electrode. On the other hand, it can be confirmed that a deviation between discharge capacities of the portions of the negative electrodes of Comparative Examples 5 and 6 was large. In particular, the negative electrode of Comparative Example 5 not comprising the second negative electrode active material layer has a larger deviation in discharge capacity and thus pre-lithiation was not achieved. The negative electrode of Comparative Example 6 in which the second active material layer of the negative electrode was formed using the negative electrode active material having a Gaussian particle diameter distribution exhibited a deviation between discharge capacities of the portions of the negative electrode, which was smaller than the deviation in discharge capacity in the negative electrode of Comparative Example 5 but was larger than that in negative electrode of Example 4.

In consideration of the results of Experimental Examples 1 and 2, it can be confirmed that the portions of the negative electrode of Comparative Example 5 not comprising the second negative electrode active material layer were non-uniformly lithiated during pre-lithiation, and thus distortion of the surface of the negative electrode occurred due to a difference in local volumetric expansion rate of the negative electrode active material layer.

Experimental Example 3

<Preparation of Positive Electrode>

94 wt % of Li(Co$_{0.2}$Ni$_{0.6}$Mn$_{0.2}$)O$_2$ as a positive electrode active material, 3 wt % of carbon black as a conductive material, and 3 wt % of PVDF as a binder were added to and dissolved in N-methyl-2-pyrrolidone (NMP) to prepare a mixed slurry for a positive electrode. An aluminum (Al) thin film having a thickness of about 20 μm, which is a positive electrode current collector, was coated with the mixed slurry for a positive electrode and was dried to prepare a positive electrode, and then roll pressing was performed.

After a porous film made of polyethylene was interposed between the manufactured positive electrode and each of the negative electrodes of Examples 4 to 6 and Comparative Examples 5 to 8, an electrolyte in which 1 M LiPF$_6$ was dissolved in a solvent in which EC and DEC were mixed in a volume ratio of 30:70 was injected and pre-lithiated for 30 minutes to prepare coin type secondary batteries.

Each of the manufactured batteries was charged at 1 C under constant current (CC)/constant voltage (CV) conditions of 4.2 V and a 0.05 C cut-off at 25° C. and was discharged under a CC condition of 1 C until 2.5 V, and then a discharge capacity thereof was measured. This was repeatedly performed for 1 to 50 cycles.

An energy density was denoted by Wh/L, which represents a capacity of the secondary battery per 1 L volume when the negative electrode active material was applied. A discharge capacity after 50 cycles was divided by a discharge capacity in 1 cycle to denote a lifetime characteristic. The results are shown in the following Table 2.

Meanwhile, variations in thickness of the negative electrodes manufactured in Examples 4 to 6 and Comparative Examples 5 to 8 and the negative electrode separated from the secondary battery after 50 cycles were measured and a variation increase rate was denoted in percent (%).

TABLE 2

|  | Energy Density (Wh/L) | Lifetime Characteristic (%) | Variation in Thickness After 50 Cycles (Swelling) |
|---|---|---|---|
| Example 4 | 665 | 84 | 38 |
| Example 5 | 670 | 81 | 44 |
| Example 6 | 640 | 83 | 39 |
| Comparative Example 5 | 675 | 34 | 124 |
| Comparative Example 6 | 670 | 58 | 87 |
| Comparative Example 7 | 730 | 0 | 170 |
| Comparative Example 8 | 690 | 15 | 152 |

As can be confirmed from Table 2, the secondary batteries comprising the negative electrode of Examples 4 to 6 had excellent lifetime characteristics and also exhibited a low negative electrode thickness increase rate as compared with the secondary batteries comprising the negative electrodes of Comparative Examples 5 to 8.

The secondary battery comprising the negative electrode of Comparative Example 6, in which the second negative electrode active material layer comprising artificial graphite exhibiting a Gaussian particle diameter distribution was formed on the first negative electrode active material layer comprising the negative electrode active material which is a mixture of silicon oxide and natural graphite, had a relatively better lifetime characteristic and a lower negative electrode thickness increase rate compared with the secondary batteries comprising the negative electrodes of Comparative Examples 5, 7, and 8. However, as compared with the secondary battery comprising the negative electrode of Example 4 in which the second negative electrode active material layer having the same thickness and comprising artificial graphite exhibiting a uni-modal particle diameter distribution was formed, the secondary battery comprising the negative electrode of Comparative Example 6 had a significantly lower lifetime characteristic and a significantly lower negative electrode thickness increase rate.

The second battery comprising the negative electrode of Comparative Example 5, in which a second negative electrode active material layer was not formed on the negative electrode active material layer comprising the negative electrode active material which is a mixture of silicon oxide and natural graphite, had a low lifetime characteristic and a large negative electrode thickness increase rate even compared with the secondary battery comprising the negative electrode of Comparative Example 6.

Meanwhile, in the secondary battery comprising the negative electrode of Comparative Example 7 using only silicon oxide having a large capacity and also a large variation in volume during charging or discharging in the first negative electrode active material layer, even though the second negative electrode active material layer comprising artificial graphite was formed, due to the variation in volume of the silicon oxide during charging or discharging, the negative electrode active material layer was separated from the negative electrode current collector such that charging or discharging was difficult after 50 cycles and the negative electrode thickness increase rate was also largest.

Further, the secondary battery comprising the negative electrode of Comparative Example 8, in which both of the first negative electrode active material layer and the second negative electrode active material layer included a mixed active material of silicon oxide and graphite, had a better lifetime characteristic and a lower negative electrode thickness increase rate compared with the second battery of Comparative Example 7. However, the silicon oxide having a relatively large variation in volume during charging or discharging was included even in the second negative electrode active material layer such that the secondary battery comprising the negative electrode of Comparative Example 8 had a low lifetime characteristic and also a large negative electrode thickness increase rate.

The invention claimed is:

1. A negative electrode for a lithium secondary battery, comprising:
   a negative electrode current collector;
   a first negative electrode active material layer present on the negative electrode current collector; and
   a second negative electrode active material layer present on the first negative electrode active material layer,
   wherein the first negative electrode active material layer comprises two or more kinds of first negative electrode active materials,
   wherein the second negative electrode active material layer comprises a second negative electrode active material, and
   wherein the second negative electrode active material has an average particle diameter ($D_{50}$) of 0.1 μm to 10 μm and has a uni-modal particle diameter distribution,
   wherein the first negative electrode active materials comprise a carbon-based negative electrode active material and a mixture of one or more selected from the group consisting of Si, particles of silicon oxide ($SiO_x$) (0<x≤2), and a Si-metal alloy as the first negative electrode active material,
   wherein the second negative electrode active material consists of a carbon-based negative electrode active material,
   wherein the carbon-based negative electrode active material of the second negative electrode active material is selected from the group consisting of natural graphite, Kish graphite, pyrolytic carbon, a mesophase pitch-based carbon fiber, a meso-carbon microbead, mesophase pitch, soft carbon, hard carbon, non-graphitizable carbon, graphitizable carbon, petroleum, and coal tar pitch derived cokes, and
   wherein a thickness of the second negative electrode active material layer is in a range of 5% to 50% with respect to a thickness of the first negative electrode active material layer.

2. The negative electrode of claim 1, wherein the second negative electrode active material has a particle diameter distribution of $D_{min}/D_{max}$.

3. The negative electrode of claim 1, wherein the second negative electrode active material has a particle diameter satisfying $D_{max}-D_{min}$<10 μm.

4. The negative electrode of claim 1, wherein the first negative electrode active material layer and the second negative electrode active material layer comprise lithium ions diffused by pre-lithiation.

5. The negative electrode of claim 1, further comprising a lithium metal layer present on the second negative electrode active material layer.

6. The negative electrode of claim 4, wherein the negative electrode is punched into an area in a range of 0.7 $cm^2$ to 12 $cm^2$ at five or more positions on an entire area of the negative electrode after pre-lithiation, and then a discharge capacity of each of the punched out portions of the negative electrode is measured, a deviation between the punched out portions is in a range of 0.1% to 15%.

7. A lithium secondary battery comprising the negative electrode according to claim 1.

* * * * *